00-243 SR
2/3/87 OR H 000,221

United States Statutory Invention Registration [19]

[11] Reg. Number: H221
[43] Published: Feb. 3, 1987

Chapin et al.

[54] FLUIDIC FUEL CONTROL FOR ADVANCED RAMJET ENGINES

[75] Inventors: Donald W. Chapin, Scottsdale; John F. Thurston, Mesa, both of Ariz.

[73] Assignee: The United States of America as represented by the Secretary of the Navy, Washington, D.C.

[21] Appl. No.: 749,687

[22] Filed: Jun. 28, 1985

[51] Int. Cl.[4] ..... F02K 3/00; F16K 31/12; F16K 31/36; F15C 1/04

[52] U.S. Cl. ..... 60/243; 137/501; 137/831

[58] Field of Search ..... 60/243; 251/61; 137/831, 501

[56] References Cited

U.S. PATENT DOCUMENTS

| | | | |
|---|---|---|---|
| 1,797,233 | 3/1931 | Huebotter | 251/61 X |
| 2,761,280 | 9/1956 | Atkinson | 60/243 |
| 3,080,713 | 3/1963 | Silver | 137/501 X |
| 3,123,128 | 3/1964 | Zeisloft | 137/501 X |
| 3,371,698 | 3/1968 | Hitzelberger et al. | 60/243 X |
| 3,633,603 | 1/1972 | Furlong et al. | 137/831 X |
| 4,138,089 | 2/1979 | McCarthy | 251/61 |
| 4,475,519 | 10/1984 | Eheim et al. | 137/831 X |

OTHER PUBLICATIONS

Clark; "Compensation of Steady State Flow Forces in Spool-Type Hydraulic Valves"; Transactions of the ASME; Nov. 1957, pp. 1784–1788.

*Primary Examiner*—Charles T. Jordan
*Attorney, Agent, or Firm*—Thomas M. Phillips

[57] ABSTRACT

A ramjet fuel control system that provides a regulated fuel pressure of a predetermined differential between the fuel pump pressure and the inlet pressure to a metering valve. The differential regulator uses a spool valve and sleeve in which the sleeve has ports positioned to prevent hydrodynamic flow force while the sleeve metering valve spool has rectangular ports so that the metering area which is uncovered by the spool is linearly related to the stroke of the valve spool.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLUIDIC FUEL CONTROL FOR ADVANCED RAMJET ENGINES

The present invention employs a differential pressure regulator and metering valve, each using a spool valve installed to prevent instability of the control system.

SUMMARY OF THE INVENTION

A ramjet engine fuel controller including a differential pressure regulator and a metering valve each having spool valve means to eliminate anomalies in fuel flow and pressures from adversely affecting operation of the system. The sleeve of the differential pressure regulator valve has ports around the circumference for eliminating hydrodynamic flow force. The sleeve of the metering valve has rectangular ports so that the metering area which is uncovered is linearly related to the stroke of the metering spool.

BACKGROUND OF THE INVENTION

1. Field of the Invention

The present invention relates to ramjet engine fuel controllers.

2. Description of the Prior Art

The requirement for air-to-air missile systems with increased range, velocity, and operating envelope dictates the employment of a propulsion system which will substantially increase aeropropulsive performance without violating existing launch platform size and weight constraints. System studies have concluded that a liquid-fueled, integral rocket ramjet offers a solution to future long range air-to-air missile requirements. Conventional pneumo-mechanical fuel controls work well for air-to-air ramjet powered missiles, but are much too large for the air-to-air envelope. Also, in some systems the control was unstable as evidenced by the metering poppet either being fully open or fully closed, which meant that the fuel flow was either at its maximum or completely cut-off.

DESCRIPTION OF THE PREFERRED EMBODIMENT

Figure 1:
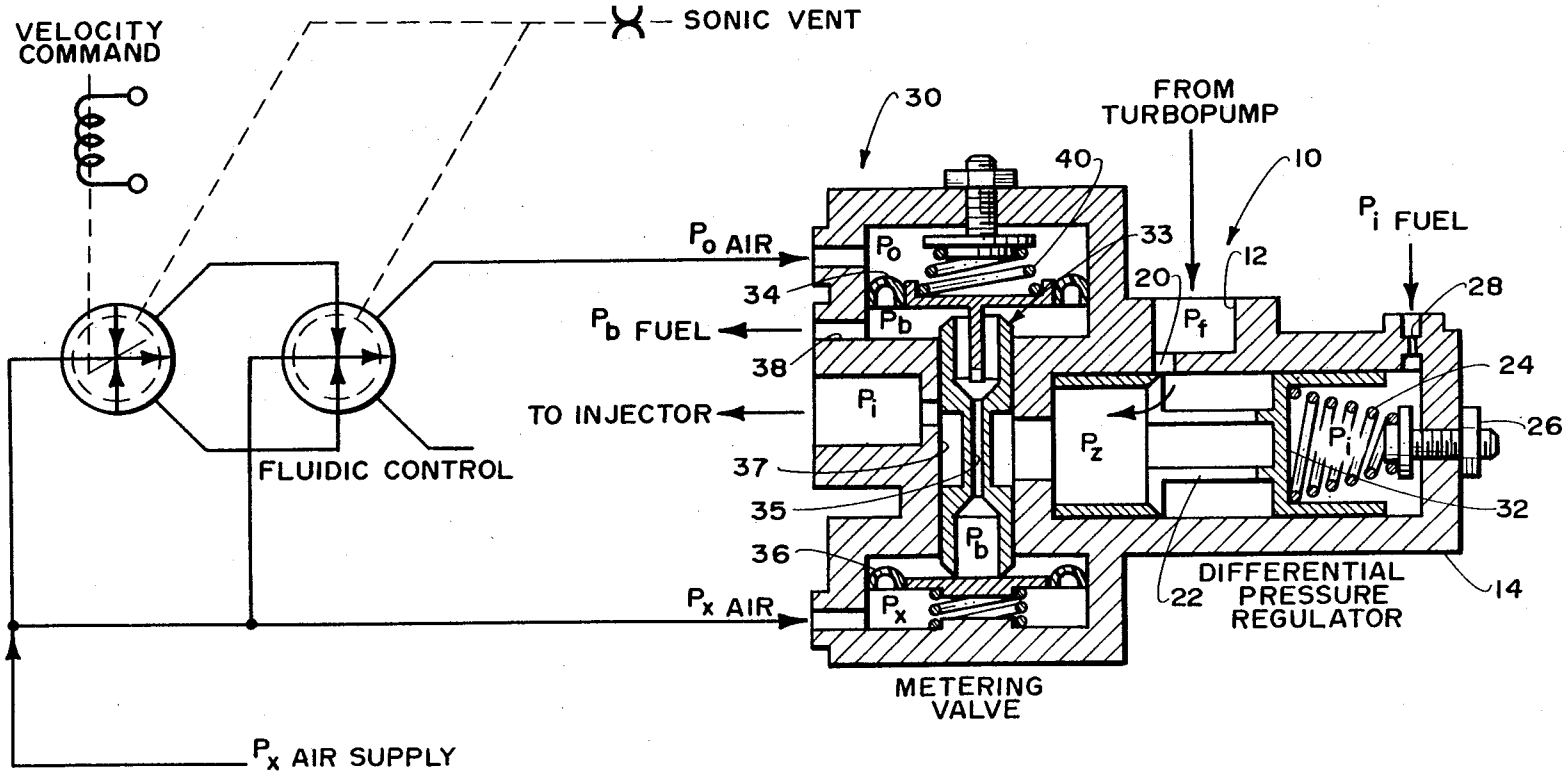
FIG. 1 is a schematic of the invention.

The invention of a ramjet engine fuel controller as show in FIG. 1 is a hydromechanical valve which is actuated by the pneumatic output of a fluidic control. The fluidic control is simply a pneumatic servo with an electrical interface. The electrical interface accepts the velocity command signal from the flight control computer and converts this electrical signal to a proportional pneumatic control pressure.

Figure 2:
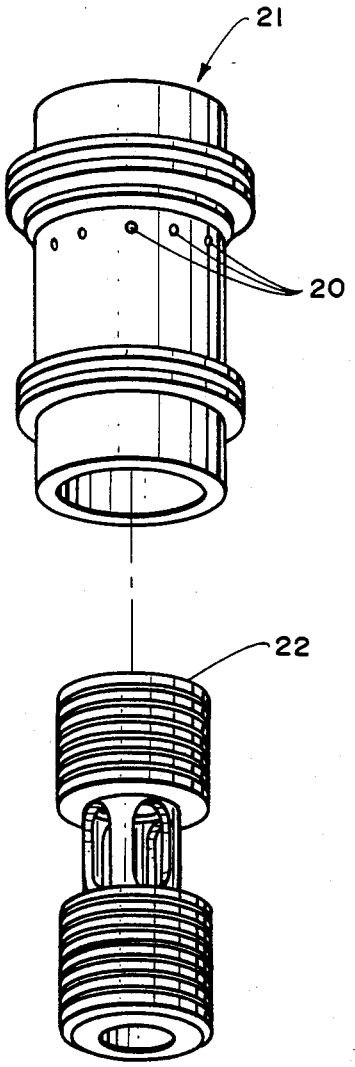
FIG. 2 shows the regulator valve sleeve and spool.
Figure 3:
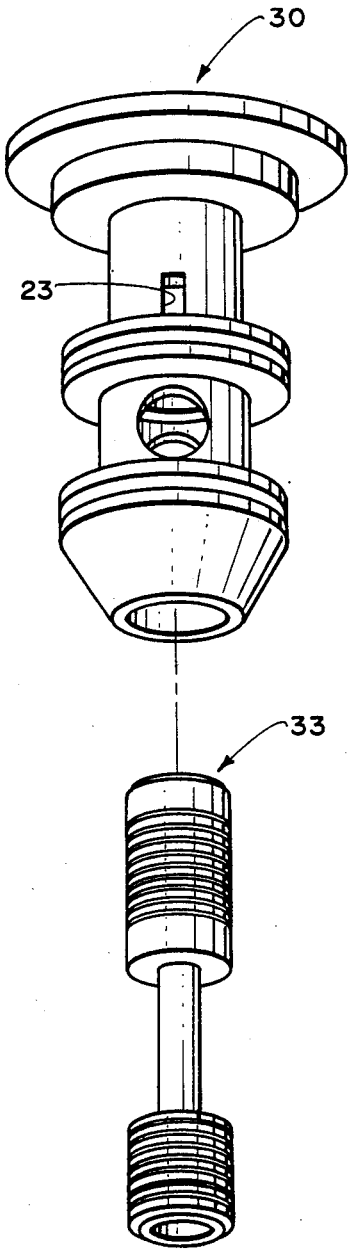
FIG. 3 shows the metering valve sleeve and spool.

Fuel from the turbopump (not shown) enters the differential pressure regulator valve 10 through the port 12 of the valve housing 14. The fuel then flows through the ports 20 of the differential pressure valve sleeve 21 (FIG. 2) which are partially covered by the differential pressure valve spool 22. Ports 20 of sleeve 21 are drilled at an angle in the well known manner for eliminating hydrodynamic flow force. Spool 22 moves to open or close the ports 20 as required to maintain a nominal pressure drop of 80 psi across the downstream metering valve at any fuel flow rate. The differential pressure is set by adjusting the preload of spring 24 by means of the nut and screw arrangement 26.

The metering valve discharge pressure, Pi, is piped to the spring end of regulator spool 22 at inlet 28. The pressure, Pz, at the opposite end of spool 22 is metering valve 30 inlet pressure. The difference between these two pressures, Pz and Pi, is nominally 80 psi, with the higher of the two being the metering valve inlet pressure, Pz. The pressure difference results in a net pressure acting on the cross-sectional end area 32 of regulator spool 22 that exactly balances the force of spring 24.

A demand for higher fuel flow opens metering valve 30, thereby causing Pz to momentarily drop. As this happens, the differential pressure decreases making the net force on the end of regulator spool at 32 decrease. Spool valve 22 must then open slightly so that the force of spring 24 can drop to match the new net pressure of the spool. As a regulator spool 22 moves to open ports 20, Pz, increases due to the higher fuel pressure, Pf, on the turbopump side of the opening 20. In this manner, the differential pressure regulator valve 10 opens and closes as necessary to maintain a constant Pz-Pi (80 psi) as any fluctuation occurs in inlet fuel pressure, fuel flow rate, or injector pressure. An orifice at 28 in the injector pressure sensing line serves to damp out any combustion pressure oscillations that are transmitted back through the fuel system.

With a constant differential pressure being held across the metering valve and with spool valve sleeve 37 having rectangular valve ports 23, the metering valve stroke of spool 33 is directly proportional to fuel flow. Diaphragms 34 and 36 have equal effective areas. A slight amount of fuel which leaks past the ends of metering valve spool 33 will pressurize one side of each diaphragm. These two volumes are interconnected through channel 35 and have a return line 38 to the fuel tank (not shown). This leakage pressure, Pb, has no effect on the position of metering valve 33, because the force which it produces on each diaphragm is equal and opposite and the net force is zero.

The position of metering spool valve 33 is controlled by the net difference between duct static pressure, Px, and fluidic output pressure, Po. The net pressure (Px−Po) acts on the diaphragm 34 area and produces a force which opposes the force of main spring 40.

Duct static pressure is a primary reference and is the measure of air flow to the engine. A single pneumatic control pressure, Po, modulates the metering valve between rich and lean fuel flow limits at a given value of air flow rate. Fuel flow increases as the pressure difference (Px−Po) becomes larger. It is important to note that Po must decrease for a given value of duct static pressure, Px, in order for fuel flow to increase. The rich limit then occurs at the lowest value of Po.

Obviously many modifications and variations of the present invention are possible in the light of the above teachings. It is therefore to be understood that within the scope of the appended claims, the invention may be practiced otherwise than as specifically described.

What is claimed is:

1. A fluidic control for advanced ramjet engines comprising:

a differential pressure regulator including a first spool valve positioned in a sleeve having ports around the circumference through which fuel under boost pressure enters said first spool valve and having an orifice adapted to be connected to the fuel injector pressure sensing line and being responsive to fuel boost pressure acting against a preset tensioning means and the fuel injector pressure to provide a regulated pressure that is equal to a predetermined pressure value plus fuel injector pressure, and a metering valve means coupled to said differential pressure regulator including a second valve member positioned in response to demand fuel control pressure acting against a duct static reference pressure to provide a fuel flow rate at said regulated pressure between a predetermined rich and lean fuel-air ratio.

2. The fluidic control of claim 1 wherein said metering valve means is a spool valve positioned in a sleeve having rectangular valve ports so that the metering area which is uncovered by the spool is linearly related to the stroke of said valve spool.

3. The fluidic control of claim 2 wherein the pressure at both ends of the metering spool is maintained the same by means of an internal axial passageway, which runs the length of the spool.

4. The fluidic control of claim 3 wherein a constant differential pressure is maintained across said metering spool resulting in said metering valve stroke being directly proportional to fuel flow.

* * * * *